United States Patent [19]

Schneider et al.

[11] Patent Number: 5,684,107
[45] Date of Patent: Nov. 4, 1997

[54] AGGLOMERATED POLYMER PARTICLES OF FINELY DIVIDED, WATER-SOLUBLE OR WATER-SWELLABLE POLYMERS, THE PREPARATION THEREOF AND THE USE THEREOF

[75] Inventors: Reinhard Schneider, Frankenthal; Norbert Grund, Ludwigshafen; Heinrich Hartmann, Limburgerhof, all of Germany

[73] Assignee: BASF Aktiengesellschaft, Ludwigshafen, Germany

[21] Appl. No.: 222,587

[22] Filed: Apr. 4, 1994

Related U.S. Application Data

[62] Division of Ser. No. 104,066, filed as PCT/EP92/00226, Feb. 3, 1992, Pat. No. 5,346,986.

[30] Foreign Application Priority Data

Feb. 9, 1991 [DE] Germany ............ 41 03 969.6

[51] Int. Cl.$^6$ ............ C08F 20/06
[52] U.S. Cl. ............ 526/303.1; 526/317.1; 526/347.2
[58] Field of Search ............ 526/303.1, 317.1, 526/347.2

[56] References Cited

U.S. PATENT DOCUMENTS

| | | | |
|---|---|---|---|
| 2,982,749 | 5/1961 | Friedrich et al. | 526/207 |
| 3,284,393 | 11/1966 | Vanderhoff et al. | 524/801 |
| 3,377,323 | 4/1968 | Ioka et al. | 528/502 |
| 3,849,361 | 11/1974 | Zweigle | 524/376 |
| 3,975,341 | 8/1976 | Trapasso | 524/801 |
| 4,038,476 | 7/1977 | Atasoy et al. | 428/402 |
| 4,056,503 | 11/1977 | Powanda et al. | 526/320 |
| 4,059,552 | 11/1977 | Zweigle et al. | 524/555 |
| 4,191,672 | 3/1980 | Salome et al. | 428/402 |
| 4,299,755 | 11/1981 | Keggenhoff et al. | 524/55 |
| 4,535,098 | 8/1985 | Evani et al. | 526/318.4 |

FOREIGN PATENT DOCUMENTS

| | | |
|---|---|---|
| 0150933 | 1/1985 | European Pat. Off. . |
| 0161038 | 1/1985 | European Pat. Off. . |
| 0412388 | 7/1990 | European Pat. Off. . |
| 2419764 | 4/1974 | Germany . |
| 2557324 | 12/1975 | Germany . |
| 2926103 | 6/1979 | Germany . |
| 3641770 | 6/1986 | Germany . |

*Primary Examiner*—Thomas R. Weber
*Attorney, Agent, or Firm*—Oblon, Spivak, McClelland, Maier & Neustadt, P.C.

[57] ABSTRACT

Agglomerated polymer particles of finely divided, water-soluble or water-swellable polymers are prepared by azeotropic dewatering of water-in-oil emulsions of water-soluble or water-swellable polymers in the presence of from 1 to 40% by weight, based on the polymers, of polyalkylene glycols which (a) are obtainable by an addition reaction of $C_2$–$C_4$-alkylene oxides with alcohols, phenols, amines or carboxylic acids and (b) contain not less than 2 polymerized alkylene oxide units and isolation of the agglomerated polymer particles. The water-soluble agglomerated polymer particles are used as flocculants and retention and drainage aids, while the water-swellable polymer powders are employed as thickeners for aqueous systems, in particular as thickeners for textile print pastes.

15 Claims, No Drawings

AGGLOMERATED POLYMER PARTICLES OF FINELY DIVIDED, WATER-SOLUBLE OR WATER-SWELLABLE POLYMERS, THE PREPARATION THEREOF AND THE USE THEREOF

This is a division of application Ser. No. 08/104,066, filed as PCT/EP92/00226, Feb. 3, 1992, now U.S. Pat. No. 5,346,986.

The present invention relates to agglomerated polymer particles of finely divided, water-soluble or water-swellable polymers and to a process for the preparation by agglomeration and isolation of the polymer particles from a water-in-oil emulsion of water-soluble or water-swellable polymers, and the use of the polymers as flocculants, retention and drainage aids and thickeners for increasing the viscosity of aqueous systems.

Water-soluble bead polymers are obtainable by the method of reverse suspension polymerization according to U.S. Pat. No. 2,982,749, by suspending an aqueous solution of monomers in a hydrophobic liquid using a water-in-oil suspending agent and polymerizing the monomers therein in the presence of a polymerization initiator. The resulting polymer beads are isolated and dried. Because of the particle size of about 100–500 μm, isolation of the polymer beads presents no difficulties.

U.S. Pat. No. 3,284,393 discloses a process for the preparation of water-in-oil emulsion polymers, in which the water-soluble monomers are emulsified in the presence of water-in-oil emulsifiers with the action of high shear forces in an inert hydrophobic liquid and are then polymerized therein in the presence of free radical polymerization initiators. The mean particle size of the polymers is, for example, 0.1 μm. The polymers cannot be isolated from such water-in-oil polymer emulsions by filtration or centrifuging. Instead, in order to obtain them in pure form, it is necessary to flocculate the polymers from the emulsion and then filter them. This process is unsuitable for industrial use because large amounts of precipitating agents are used and expensive purification of the oil phase is therefore necessary. According to U.S. Pat. No. 3,642,109, water-in-oil emulsions of water-soluble polymers were therefore used directly by inverting the water-in-oil polymer emulsions in the presence of a wetting agent and an aqueous medium, the polymer rapidly going into solution. The disadvantage here is that the oil phase of the water-in-oil polymer emulsion is lost.

U.S. Pat. No. 4,059,552 discloses crosslinked, finely divided polymers whose particle diameter is less than 4 μm. These polymers are prepared from water-soluble, monoethylenically unsaturated monomers in the presence of crosslinking agents by the method of water-in-oil emulsion polymerization or by the method of inverse suspension polymerization. In both methods, a special emulsification apparatus is required for obtaining the desired small particle size of the polymers. The finely divided water-in-oil polymer emulsions are subjected to azeotropic distillation to distill off the water from them. The polymers are obtained by adding a flocculant to the polymer suspension dewatered by azeotropic distillation, and then filtering off the polymer particles. As stated above, the use of a flocculant is technically complicated.

German Laid-Open Application DOS 2,419,764 discloses the azeotropic dewatering of water-in-oil polymer emulsions to give nonaqueous polymer dispersions. The mean particle size of the polymers is from 0.01 to 1 μm. These finely divided dispersions have a long shelf life. The polymers cannot be obtained therefrom by filtration, decanting or centrifuging.

German Laid-Open Application DOS 2,557,324 discloses a process for the preparation of water-in-oil dispersions of acrylamide polymers which are stable to sedimentation. Wetting agents having an HLB above 10 and special water-in-oil emulsifiers are used for this purpose. The polymers contained in the emulsions like-wise cannot be filtered off or isolated by centrifuging.

The process of German Laid-Open Application DOS 3,641,700 gives water-in-oil emulsions of crosslinked, water-swellable polymers by copolymerization of water-soluble ethylenically unsaturated monomers with from 100 to 5,000 ppm, based on the monomer mixture, of a bifunctional or polyfunctional crosslinking agent in the aqueous phase of a water-in-oil emulsion in the presence of a water-in-oil emulsifier and of an emulsifier having an HLB of not less than 10, using water-soluble polymerization initiators. The polymer cannot be isolated from such dispersions by simple filtration, decanting or centrifuging.

U.S. Pat. No. 3,849,361 discloses the preparation of microdisperse suspensions of water-soluble or water-dispersible polymers in polyglycols by azeotropically dewatering water-in-oil polymer emulsions, subsequently adding polyglycols and distilling off the oils of the water-in-oil polymer emulsions originally used. The polymer suspensions in polyglycols, which suspensions are obtainable in this manner and are stable to sedimentation, are used directly, for example as thickeners for aqueous systems.

U.S. Pat. No. 3,975,341 discloses a process for the preparation of finely divided polymers which form gel-free aqueous solutions when introduced into water. The polymers are prepared by adding an aqueous solution which contains a polymerization initiator and at least about 50% by weight, based on the solution, of water-soluble monoethylenically unsaturated monomers in a controlled manner to a refluxing azeotropic emulsion which consists of a larger amount of an oil and a smaller amount of water. After the end of the monomer addition, the water is distilled off azeotropically and the finely divided polymer is filtered off. In order to obtain water-soluble polymers, the polymerization is carried out in the presence of a gel inhibitor, for example isopropanol, isobutanol, glycerol or 1,3-butylene glycol. The polymer particles consist of a highly cohesive aggregation of smaller polymer particles.

The previously unpublished EP-A-412 388 discloses a process for the preparation of finely divided polymer powders by polymerization of water-soluble monomers in the aqueous phase of a water-in-oil emulsion in the presence of water-in-oil emulsifiers and polymerization initiators, azeotropic dewatering of the resulting water-in-oil polymer suspension and isolation of the suspended finely divided polymer powders, wherein either the polymerization of the water-soluble monomers is carried out in the presence of from 0.1 to 10% by weight, based on the monomers used in the polymerization, of protective colloids or the protective colloids are added to the water-in-oil polymer suspension after the end of the polymerization. In this process, agglomeration of the primary particles of the water-in-oil polymer emulsions takes place, so that filterable polymer suspensions are obtained. By adding aprotic, polar solvents, the filterability of the polymer suspensions present after the azeotropic dewatering can be improved but further improved filterability is desirable.

The abovementioned prior art discloses that the polymers obtainable by the inverse water-in-oil polymerization can be relatively easily isolated, but this process is relatively expensive in practice and leads to polymer beads which cannot be completely dissolved immediately in water. On the other hand, stirring in a water-in-oil polymer emulsion in the presence of a wetting agent gives an aqueous polymer solution virtually immediately. However, the disadvantage here is that the oil phase is lost. Furthermore, this is undesirable for ecological reasons. The powders obtained from water-in-oil polymer emulsions by the other processes frequently have the disadvantage that they give rise to large amounts of dust during handling.

It is an object of the present invention to provide finely divided, water-soluble or water-swellable polymers and a process for the preparation thereof. The polymer powders should be virtually dust-free and have a very uniform particle size distribution.

We have found that the first-mentioned object is achieved, according to the invention, by agglomerated polymer particles of water-soluble or water-swellable polymers having a mean particle diameter of from 20 to 5000 μm, which consist of primary particles which have a mean particle diameter of from 0.1 to 15 μm and are obtainable by polymerizing water-soluble monomers in the presence or absence of crosslinking agents by a water-in-oil polymerization method, and can be prepared by azeotropically dewatering the water-in-oil polymer emulsion containing the primary particles in the presence of a polyalkylene glycol which has an agglomerating effect and which a) is obtainable by an addition reaction of a $C_2$–$C_4$-alkylene oxide with an alcohol, phenol, amine or carboxylic acid and b) contains not less than 2 polymerized alkylene oxide units, and wherein the agglomerated polymer particles disintegrate into the primary particles when introduced into an aqueous medium.

We have found that the other object is achieved, according to the invention, by a process for the preparation of finely divided, water-soluble or water-swellable polymers by isolating the polymer particles from a water-in-oil emulsion of a water-soluble or water-swellable polymer if the water-in-oil polymer emulsion is azeotropically dewatered in the presence of from 1 to 40% by weight, based on the polymer, of a polyalkylene glycol which has an agglomerating effect and which a) is obtainable by an addition reaction of a $C_2$–$C_4$-alkylene oxide with an alcohol, phenol, amine or carboxylic acid and b) contains not less than 2 polymerized alkylene oxide units with agglomeration of the primary particles of the polymer emulsion, and the agglomerated polymer particles are isolated.

In the novel process, powders which are virtually dust-free and have a uniform particle size distribution are obtained from water-in-oil polymer emulsions.

Water-in-oil emulsions of water-soluble or of water-swellable polymers are known (cf. U.S. Pat. No. 3,284,393, U.S. Pat. No. 4,059,552, DE-A-36 41 700 and U.S. Pat. No. 3,849,361). The water-in-oil polymer emulsions are obtainable by polymerizing water-soluble monoethylenically unsaturated monomers, if necessary together with monomers which act as crosslinking agents and contain two or more ethylenically unsaturated double bonds, in the aqueous phase of a water-in-oil emulsion in the presence of water-in-oil emulsifiers and polymerization initiators.

All water-soluble monoethylenically unsaturated monomers can be used in the polymerization. These monomers are, for example, monoethylenically unsaturated $C_3$–$C_6$-carboxylic acids, such as acrylic acid, methacrylic acid, itaconic acid, maleic acid, fumaric acid and methacrylic acid, and the amides of these carboxylic acids, in particular acrylamide and methacrylamide. Other suitable water-soluble monomers are, for example, 2-acrylamidomethylpropanesulfonic acid, vinylsulfonic acid, vinylphosphonic acid and vinyllactic acid. The monomers which contain carboxyl, sulfo or phosphonyl groups can also be used in the polymerization in a form partially or completely neutralized with an alkali metal base, ammonia or an amine.

Further suitable water-soluble monoethylenically unsaturated monomers are di-$C_1$–$C_3$-alkylamino-$C_2$–$C_6$-alkyl (meth)acrylates, such as dimethylaminoethyl acrylate, dimethylaminoethyl methacrylate, diethylaminoethyl acrylate, diethylaminoethyl methacrylate, dimethylaminopropyl acrylate, dimethylaminobutyl acrylate, dimethylaminoneopentyl acrylate and dimethylaminoneopentyl methacrylate. The basic acrylates and methacrylates are preferably used as salts or in quaternized form in the homo- or copolymerization. The basic acrylates and methacrylates are neutralized, for example, with the aid of hydrochloric acid, hydrobromic acid, sulfuric acid, phosphoric acid or a carboxylic acid, such as formic acid, acetic acid or propionic acid. The basic acrylates and methacrylates are also used in quaternized form. The quaternization products are obtained by quaternizing these compounds with conventional quaternizing agents, such as methyl chloride, ethyl chloride, benzyl chloride, lauryl chloride, dimethyl sulfate, diethyl sulfate or epichlorohydrin. Other suitable monomers are olefinically unsaturated nitriles, such as acrylonitrile or methacrylonitrile.

Water-soluble diallylammonium compounds of the general formulae

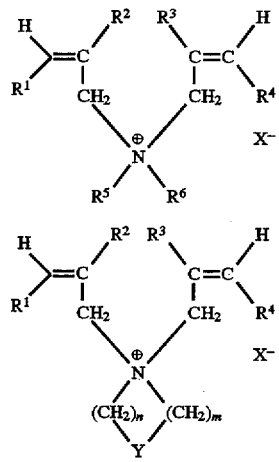

where $X^-$ is a halide ion, such as a chloride, fluoride, bromide or iodide ion, or a hydroxide, nitrate, methosulfate, bisulfate or dihydrogen phosphate ion, n and m are each the integer 1 or 2, n and m are each preferably 2, Y is

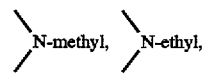

preferably oxygen or

and $R^1$, $R^2$, $R^3$ and $R^4$ are each hydrogen or alkyl of 1 to 6 carbon atoms and $R^5$ and $R^6$ are each H or straight-chain or branched alkyl of 1 to 18, preferably 1 to 6, carbon atoms or aryl and/or benzyl.

Examples of diolefinically unsaturated monomers of this type are dimethyldiallylammonium chloride, dimethyldiallylammonium bromide, diethyldiallylammonium chloride, methyl-tert-butyldiallylammonium methosulfate, methyl-n-propyldiallylammonium chloride, dimethyldiallylammonium bisulfate, dimethyldiallylammonium dihydrogen phosphate, di-n-butyldiallylammonium bromide, diallylpiperidinium bromide, diallylpyrrolidinium chloride and diallylmorpholinium bromide.

N-Vinylpyrrolidones, such as N-vinylpyrrolidone, are also suitable. Another suitable water-soluble monomer is N-vinylformamide. It is copolymerized either alone or as a mixture with other ethylenically unsaturated monomers, for example with N-vinylpyrrolidone, acrylamide, methacrylamide, vinyl acetate, N-vinylimidazole, N-vinylimidazoline and/or dimethylaminoethyl acrylate.

Another group of water-soluble monomers comprises N-methylolamides of $C_3$–$C_6$-monoethylenically unsaturated carboxylic acids, for example N-methylolacrylamide and N-methylolmethacrylamide. These monomers are preferably used in the preparation of copolymers, for example copolymers of acrylamide and N-methylolacrylamide or copolymers of acrylamide, acrylic acid and N-methylolacrylamide.

Other suitable water-soluble monomers are N-vinylimidazolium compounds which can be characterized, for example, by the formula

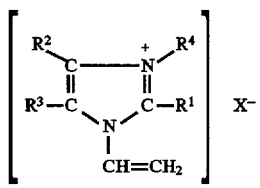

where $R^1$, $R^2$ and $R^3$ are each H or $CH_3$, $R^1$ can furthermore be $C_2H_5$, $C_3H_7$ or $C_4H_9$, $R^4$ is H, $C_1$–$C_6$-alkyl or benzyl or

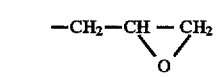

and $X^-$ is an anion, such as $Cl^-$, $Br^-$, $I^-$, methosulfate, ethosulfate, acetate, sulfate, bisulfate or dihydrogen phosphate. Unsubstituted N-vinylimidazole in salt form is preferably used from this class of compounds. Other suitable water-soluble monomers are N-vinylimidazolines, which can be characterized, for example, by the general formula

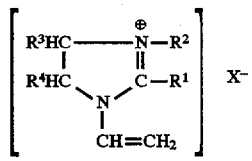

where $R^1$ is H, $C_1$–$C_{18}$-alkyl or

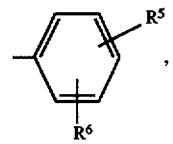

$R^5$ and $R^6$ are each H, $C_1$–$C_4$-alkyl or Cl, $R^2$ is H, $C_1$–$C_{18}$-alkyl,

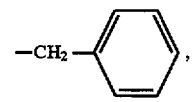

or

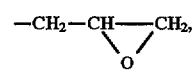

$R^3$ and $R^4$ are each H or $C_1$–$C_4$-alkyl and $X^-$ is an acid radical.

From this group of compounds, 1-vinyl-2-imidazoline salts of the formula II

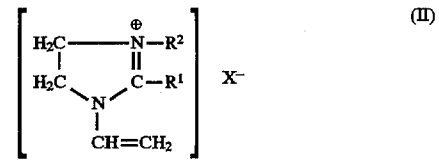

where $R^1$ is H, $CH_3$, $C_2H_5$, n- or iso-$C_3H_7$ or $C_6$–$C_5$ and $X^-$ is an acid radical, preferably $Cl^-$, $Br^-$, $SO_4^{2-}$, $HSO_4^{\ominus}$, $H_2PO_4^{\ominus}$, $CH_3O$—$SO_3^-$, $C_2H_5$—$O$—$SO_3^-$ or $R^1$—$COO^-$ and $R^2$ is H, $C_1$–$C_4$-alkyl or aryl, are preferably used in the polymerization.

The substituent $X^-$ in the formulae I and II can in principle be any acid radical of an inorganic or organic acid. Monomers of the formula I are obtained by neutralizing the free base, ie. a 1-vinyl-2-imidazoline, with an equivalent amount of an acid. The vinyl-imidazolines can also be neutralized, for example, with trichloroacetic acid, benzenesulfonic acid or toluenesulfonic acid. In addition to salts of 1-vinyl-2-imidazolines, quaternized 1-vinyl-2-imidazolines are also suitable. They are prepared by reacting 1-vinyl-2-imidazolines, which may be substituted in the 2-, 4- or 5-position, with known quaternizing agents. Examples of suitable quaternizing agents are $C_1$–$C_{18}$-alkyl chlorides or bromides, benzyl chloride, benzyl bromide, epichlorohydrin, dimethyl sulfate and diethyl sulfate. Preferably used quaternizing agents are epichlorohydrin, benzyl chloride, dimethyl sulfate and methyl chloride.

Preferred water-soluble ethylenically unsaturated monomers are acrylic acid, methacrylic acid, 2-acrylamido-2-methylpropanesulfonic acid, N-vinylpyrrolidone, acrylamide and methacrylamide, as well as diallyldimethylammonium chloride. The monomers can be polymerized either alone to give homopolymers or as a mixture with one another to give copolymers. For example, copolymers of acrylamide and acrylic acid, copolymers of acrylamide and methacrylic acid, copolymers of methacrylamide and acrylic acid, copolymers of methacrylamide and methacrylic acid, copolymers of acrylamide, acrylic acid and 2-acrylamido-2-methylpropanesulfonic acid, copolymers of acrylamide, acrylic acid and N-vinylpyrrolidone, copolymers of acrylamide and dimethylaminoethyl acrylate, copolymers of acrylamide and diethylaminoethyl methacrylate and copolymers of methacrylamide and dimethylaminoethyl acrylate are of particular interest. The carboxylic acids and the other ethylenically unsaturated acids, such as vinylsulfonic acid and acrylamidomethyl-propanesulfonic acid, can be used either in the form of the free acid or in partially or completely neutralized form in the polymerization. Examples of bases used for neutralizing these monomers are sodium hydroxide solution, potassium hydroxide solution, ammonia and amines, such as triethylamine, butylamine, morpholine and ethanolamine.

Other suitable water-soluble monoethylenically unsaturated monomers are the hydroxyalkyl esters of monoethylenically unsaturated $C_3$–$C_5$-carboxylic acids, eg. hydroxyethyl acrylate, hydroxyethyl methacrylate, 2-hydroxypropyl acrylate, 3-hydroxypropyl acrylate, 3-hydroxypropyl methacrylate, 2-hydroxypropyl methacrylate, hydroxybutyl acrylates and hydroxybutyl methacrylates and 1,6-hydroxyhexyl acrylate. This group of monomers can be copolymerized with the other abovementioned monomers. Copolymers of acrylamide and 2-hydroxyethyl acrylate, copolymers of acrylamide, acrylic acid and 2-hydroxyethyl acrylate and copolymers of methacrylic acid, acrylamide and 2-hydroxyethyl acrylate are of particular interest here.

The water-soluble monoethylenically unsaturated monomers can, if required, be copolymerized together with water-insoluble monomers in order to modify the properties of the water-soluble polymers. The amount of water-insoluble monomers used is no more than an amount such that the resulting polymers are still soluble in water or the polymers in the form of the salts are water-soluble. Examples of suitable water-insoluble monomers are vinyl acetate, vinyl propionate, vinyl butyrate, $C_1$–$C_{18}$-alkyl esters of monoethylenically unsaturated $C_3$–$C_6$-carboxylic acids, eg. methyl acrylate, ethyl acrylate, n-propyl acrylate, isopropyl acrylate, n-butyl acrylate, isobutyl acrylate, n-octyl acrylate, isooctyl acrylate, palmityl acrylate and stearyl acrylate, and the corresponding esters of methacrylic acid, eg. methyl methacrylate, ethyl methacrylate, n-butyl methacrylate and stearyl methacrylate. Other suitable esters of this type are, for example, the half-esters of maleic acid, eg. monomethyl maleate or monobutyl maleate, and monoethyl itaconate.

Water-swellable polymers are prepared by additionally using crosslinking agents, ie. compounds which contain two or more ethylenically unsaturated, non-conjugated double bonds in the molecule, in the polymerization of water-soluble monomers as described above by way of example. Examples of suitable crosslinking agents are N,N'-methylenebisacrylamide, polyethylene glycol diacrylates and polyethylene glycol dimethacrylates, each of which is derived from a polyethylene glycol having a molecular weight of from 106 to 8,500, trimethylolpropane triacrylate, trimethylolpropane trimethacrylate, ethylene glycol diacrylate, propylene glycol diacrylate, butane-diol diacrylate, hexanediol diacrylate, hexanediol dimethacrylate, diacrylates and dimethacrylates of block copolymers of ethylene oxide and propylene oxide, adducts of ethylene oxide and/or propylene oxide with trimethylolpropane, which adducts are diesterified or triesterified with acrylic acid or methacrylic acid, polyhydric alcohols which are diesterified or polyesterified with acrylic acid or methacrylic acid, such as glycerol or pentaerythritol, triallylamine, tetraallylethylenediamine, divinylbenzene, diallyl phthalate, polyethylene glycol divinyl ether, trimethylolpropane diallyl ether, polyethylene glycol divinyl ether, butanediol divinyl ether, pentaerythritol triallyl ether and/or divinylethyleneurea and/or triallylmonoalkylammonium salts, eg. triallylmethylammonium chloride. Water-soluble cross-linking agents, eg. N,N'-methylenebisacrylamide, polyethylene glycol diacrylates, polyethylene glycol dimethacrylates, pentaerythritol triallyl ether and/or divinylurea, are preferably used. The crosslinking agents are employed in an amount of from 50 to 5,000 ppm, corresponding to about 0.003–0.3 mol %, based on the monomers used in the polymerization.

In order to polymerize the monomers, they are first dissolved in water. The concentration of the monomers in the aqueous solution is from 20 to 80, preferably from 30 to 60,% by weight. The aqueous solution is then emulsified in an inert hydrophobic liquid (oil phase) in the presence of one or more water-in-oil emulsifiers, with formation of a water-in-oil emulsion. Virtually all water-immiscible liquids which do not intervene in the polymerization can be used as inert hydrophobic liquids. Aliphatic and aromatic hydrocarbons or mixtures of aliphatic and aromatic hydrocarbons are preferably used for this purpose. Suitable aliphatic hydrocarbons are, for example, pentane, hexane, heptane, octane, nonane, decane, cyclohexane, methylcyclohexane, decalin, isooctane and ethylcyclohexane. Aromatic hydrocarbons which are used as the hydrophobic liquid in the inverse suspension polymerization are, for example, benzene, toluene, xylene and isopropylbenzene. In addition, it is of course also possible to use halogenated hydrocarbons, such as tetrachloroethane, hexachloroethane, trichloroethane and chlorobenzene. Cyclohexane, methylcyclohexane or hydrocarbons boiling within a range from 60° to 170° C. are preferably used. The amount of the oil phase in the water-in-oil polymer emulsion is from 15 to 70, preferably from 20 to 60,% by weight.

In order to disperse the aqueous monomer solution in the oil phase, the water-in-oil emulsifiers known for this purpose are used. These are, for example, sorbitan esters, such as sorbitan monostearate, sorbitan monooleate, sorbitan palmirate and sorbitan laurate, and glyceryl esters whose acid component is derived from $C_{14}$–$C_{20}$-carboxylic acids. Other suitable emulsifiers are the water-in-oil emulsifiers which are disclosed in German Patent 2,557,324 and are obtainable by A) reacting $C_{10}$–$C_{22}$-fatty alcohols with epichlorohydrin in a molar ratio of from 1:0.5 to 1:1.5 to give glycidyl ethers, B) reacting the glycidyl ethers with (1) saturated $C_2$–$C_6$-alcohols containing from 2 to 6 OH groups or (2) monoethers thereof with $C_{10}$–$C_{22}$ fatty alcohols in a molar ratio of glycidyl ethers to (1) or (2) of from 1:0.5 to 1:6 in the presence of acids or bases and C) alkoxylating the reaction products from (B) with one or more $C_2$–$C_4$-alkylene oxides in a molar ratio of from 1:1 to 1:6.

The suitable water-in-oil emulsifiers have an HLB of not more than 8. The HLB is the hydrophilic lipophilic balance of the emulsifier (cf. W. C. Griffin, J. Soc. Cosmet. Chem. 1 (1949), 311). The water-in-oil emulsifiers are used in an amount of from 2 to 20, preferably from 5 to 15% by weight, based on the monomers used. Preferably used water-in-oil emulsifiers are those described in the stated German Patent 2,557,324.

Suitable free radical polymerization initiators are all conventionally used polymerization initiators. Water-soluble initiators, such as alkali metal or ammonium peroxydisulfates, hydrogen peroxide, diacetyl peroxydicarbonate, dicyclohexyl peroxydicarbonate, tertbutyl perpivalate, dilauroyl peroxide, dibenzoyl peroxide, tert-butyl per-2-ethylhexanoate, tert-butyl permaleate, bis-(tertbutyl peroxide)-cyclohexane, tertbutyl peracetate, dicumyl peroxide, di-tert-amyl peroxide, di-tert-butyl peroxide, cumyl hydroperoxide, tertbutyl hydroperoxide and p-menthane hydroperoxide and azo initiators, such as 2,2'-azobis-(2-methyl-N-phenyl-propionamidine) dihydrochloride, 2,2'-azobis-(2-methyl-propionamidine) dihydrochloride, 2,2'-azobis-(2,4-dimethylvaleronitrile), 2,2'-azobisisobutyronitrile, 2,2'-azobis-(2-amidinopropane) dihydrochloride and 2,2'-azobis-[2-(2-imidazolin-2-yl)-propane] dihydrochloride, are preferred. Preferred initiators are alkali metal and ammonium persulfates, tert-butyl perpivalate, tert-butyl per-2-ethylhexanoate, 2,2'-azobis-(2,4-dimethylvaleronitrile), 2,2'-azobis-(2-amidinopropane) dihydrochloride, azobis-(isobutyronitrile) and 2,2'-azobis-[2-(2-imidzolin-2-yl)-propane] dihydrochloride [sic]. It is possible to use either a single initiator or a mixture of a plurality of initiators. The choice of the initiators depends primarily on the temperature at which the polymerization is carried out. The salts of heavy metals, for example copper, cobalt, manganese, iron, nickel and chromium salts, and/or organic compounds, such as benzoin, dimethylaniline and ascorbic acid, and reducing agents, such as an alkali metal disulfite or formaldehyde sodium sulfoxylate, may additionally be used together with one or more of the abovementioned free radical polymerization initiators. Such mixtures of initiators permit polymerization at lower temperatures. The reducing component of redox initiators can be formed, for example, by sodium sulfite, sodium bisulfite, sodium formaldehyde sulfoxylate or hydrazine. From 100 to 10,000 ppm, preferably from 100 to 2,000 ppm, based on the monomers used in the polymerization, of a polymerization initiator or of a mixture of a plurality of polymerization initiators, are required. The stated amounts of initiator correspond to about 0.003–0.3 mol %, based on the monomers used, of initiator.

In a preferred embodiment of the invention, the polymerization of the water-soluble monomers is carried out additionally in the presence of one or more oil-in-water emulsifiers. The use of this group of emulsifiers permits the preparation of particularly finely divided water-in-oil polymer emulsions stable to sedimentation. Examples of suitable oil-in-water emulsifiers are all wetting agents which have an HLB of not less than 10. This group of emulsifiers essentially consists of hydrophilic water-soluble compounds, such as ethoxylated alkylphenols or ethoxylated fatty alcohols. Products of this type are obtained, for example, by reacting $C_8$–$C_{12}$-alkylphenols or $C_8$–$C_{22}$-fatty alcohols with ethylene oxide. $C_{12}$–$C_{18}$-fatty alcohols are preferably ethoxylated. The molar ratio of alkylphenol or fatty alcohol to ethylene oxide is in general from 1:5 to 1:20. Other suitable emulsifiers are, for example, alkoxylated fatty amines. If the emulsifiers [lacuna] an HLB of 10 or higher are used in the polymerization, they are employed in amounts of from 1 to 20, preferably from 2 to 15% by weight, based on the monomers to be polymerized.

The polymerization of the monomers is carried out in the aqueous phase of a water-in-oil emulsion in the presence of a water-in-oil emulsifier and, if required, an oil-in-water emulsifier and in the presence of a free radical polymerization initiator. The water-in-oil polymer emulsions obtainable contain the polymers in the form of primary particles having mean particle sizes of about 0.1–15 μm, preferably 0.5–5 μm. Not less than 90% of the primary particles of the water-in-oil polymer emulsion have a mean particle diameter of less than 10 μm.

According to the invention, the known water-in-oil emulsions of water-soluble or water-swellable polymers are dewatered in the presence of from 1 to 40, preferably from 5 to 20,% by weight, based on the polymers, of polyalkylene glycols which have an agglomerating effect and which a) are obtainable by an addition reaction of $C_2$–$C_4$-alkylene oxides with alcohols, phenols, amines or carboxylic acids and b) contain not less than 2 polymerized alkylene oxide units.

The polyalkylene glycols effect agglomeration of the primary particles of the water-in-oil polymer emulsion during the azeotropic dewatering of the water-in-oil polymer emulsions. After the azeotropic dewatering, agglomerates of primary particles which, according to sieve analysis, have mean particle diameters of about 20–5,000 μm, preferably 50–2,500 μm, are present. Not less than 70%, preferably from 80 to 99%, of the water contained in the water-in-oil emulsion polymers is removed by azeotropic distillation. Small amounts of water which remain in the polymers do not have an adverse effect and, on the contrary, result in the agglomerated particles dissolving more rapidly in water than completely dry agglomerated particles. Commercial water-in-oil polymer emulsions which have a solids content of more than 20% by weight are advantageously mixed, before the beginning of the azeotropic distillation, with from 10 to 200, preferably from 50 to 150% by weight of a hydrocarbon having a boiling point of less than 150° C. The azeotropic dewatering of the water-in-oil polymer emulsions can be carried out under atmospheric, reduced or superatmospheric pressure, for example at from 100 mbar to 15 bar. The temperatures are preferably chosen so that the water-in-oil polymer emulsions which are dewatered are as far as possible not impaired. Usually, the water-in-oil polymer emulsions are heated to 60°–170° C.

The polyalkylene glycols which are suitable agglomeration assistants are obtainable, for example, by subjecting the suitable alkylene oxides, ie. ethylene oxide, propylene oxide, 1,2-butylene oxide, isobutylene oxide and tetrahydrofuran, to an addition reaction with alcohols, phenols, amines or carboxylic acids. The stated alkylene oxides and tetrahydrofuran can be polymerized either alone or as a mixture. If mixtures are used, polymeric compounds in which the alkylene oxide units are randomly distributed are obtained. However, it is also possible to allow the alkylene oxides to react in a conventional manner to give block copolymers. Homopolymers of ethylene oxide are obtained, for example, by subjecting ethylene oxide to an addition reaction with ethylene glycol. For the preparation of homopolymers of propylene oxide, the latter is subjected to an addition reaction with 1,2-propylene glycol, 1,3-propylene glycol or a mixture of the stated isomers. The preparation of the homopolymers of other alkylene oxides is carried out in a similar manner.

Block copolymers are prepared, for example, by first subjecting ethylene oxide to an addition reaction with ethylene glycol and allowing the components to react and then subjecting the product to an addition reaction with propylene oxide under the usual conditions, ie. by catalysis with an alkali metal hydroxide or calcium oxide. Here, there are many possibilities for varying the sequence of the blocks of alkylene oxide units. For example, a propylene oxide block can follow an ethylene oxide block and can be followed by an ethylene oxide block. Polyalkylene glycols which have an ethylene oxide block, a propylene oxide block and a butylene oxide block, or polyalkylene glycols in which an ethylene oxide block follows a propylene oxide block or polyalkylene oxides in which a propylene oxide block and, if desired, an ethylene oxide block follow a butylene oxide block are also suitable agglomeration assistants.

The terminal groups of the resulting polyalkylene glycols can be blocked at one or both ends. Polyalkylene glycols blocked at one end are obtained, for example, by subjecting alkylene oxides to an addition reaction with alcohols, phenols, amines or carboxylic acids. Examples of suitable alcohols are monohydric $C_1$–$C_{22}$-alcohols, eg. methanol, ethanol, n-propanol, isopropanol, n-butanol, isobutanol, n-octanol, isooctanol and stearyl alcohol. The alcohols used may also be polyhydric alcohols, for example as already mentioned above, ethylene glycols or propylene glycols and glycerol, pentaerythritol and hexane-1,6-diol. The alkylene oxides can also be subjected to an addition reaction with phenol and substituted phenols, such as $C_1$–$C_{18}$-alkylphenols. Amines are also suitable for blocking terminal groups, for example $C_1$–$C_{18}$-alkyl- or dialkylamines, and diamines, preferably ethylenediamine. Commercial products which are obtainable, for example, by subjecting ethylene oxide and propylene oxide in succession to an addition reaction with ethylenediamine are of particular interest here. Thioalcohols, such as mercaptoethanol, mercaptopropanols and mercaptobutanols, can also be alkoxylated. The terminal OH groups of the polyalkylene glycols can also be replaced by, for example, amino groups. Polyalkylene glycols whose terminal OH groups have been etherified or esterified are also suitable agglomeration assistants.

The suitable polyalkylene glycols contain not less than 2 polymerized alkylene oxide units. Examples of suitable agglomeration assistants are polyethylene glycols, polypropylene glycols, block copolymers of ethylene oxide and propylene oxide blocks having the structure EO-PO, PO-EO-PO or EO-PO-EO, polyethylene glycols etherified at one or both ends with $C_1$–$C_4$-alcohols, and compounds which are obtainable by subjecting first ethylene oxide and then propylene oxide or first propylene oxide and then ethylene oxide to an addition reaction with ethylenediamine. Suitable polyalkylene glycols having an agglomerating effect are, for example, diethylene glycol, triethylene glycol, tetraethylene glycol, pentamethylene glycol, hexaethylene glycol, heptaethylene glycol, octaethylene glycol, diethylene glycol dimethyl ether, diethylene glycol monomethyl ether, diethylene glycol diethyl ether, diethylene glycol monoethyl ether, triethylene glycol monomethyl ether, triethylene glycol dimethyl ether, triethylene glycol monoethyl ether, triethylene glycol diethyl ether, dialkylene glycol dibutyl ether, diethylene glycol monobutyl ether, diethylene glycol monopropyl ether, diethylene glycol dipropyl ether, EO-PO block copolymers having average molecular weights of from 120 to 2 million, PO-EO-PO block copolymers having average molecular weights of from 178 to 2 million and EO-PO-EO block copolymers having average molecular weights of from 164 to 2 million, polypropylene glycols having molecular weights of from 134 to 2 million, dipropylene glycol diacetate, diethylene glycol diacetate, dipropylene glycol monoacetate, diethylene glycol monoacetate, dipropylene glycol dimethyl ether and dipropylene glycol monomethyl ether. The stated molecular weights refer to the number average. The agglomeration assistants are preferably used in amounts of from 5 to 20% by weight, based on the polymers present in the water-in-oil emulsion. After the azeotropic dewatering in the presence of the polyalkylene glycols, the resulting agglomerated polymer particles can be readily isolated, for example by filtration, decanting the hydrocarbon oil or centrifuging. The hydrocarbon oil still adhering to the agglomerated polymer particles can readily be removed from said particles, for example by drying in a drying oven, preferably drying at elevated temperatures under reduced pressure.

Water-swellable polymers which contain acrylic acid, acrylamide and N-vinylpyrrolidone as essential water-soluble monoethylenically unsaturated monomers are of particular interest for use as thickeners for increasing the viscosity of aqueous systems, in particular as thickeners for print pastes which are used for printing textiles. The amount of crosslinking agent in the water-swellable polymers is about 50–5,000 ppm, preferably 200–2,000 ppm. The amount of polymerized acrylic acid is from 60 to 98%, that of polymerized acrylamide is from 1 to 20% by weight and that of polymerized N-vinyl-pyrrolidone is from 1 to 20% by weight. In the novel process, powders having a uniform particle size distribution are obtained in particular when the polymers of the water-in-oil polymer emulsions contain not less than 1% by weight of N-vinylpyrrolidone. In the case of predominantly from [sic] anionic polymers a content of from 3 to 25% by weight of polymerized N-vinylpyrrolidone gives copolymers having a particularly uniform particle size distribution.

The finely divided, agglomerated, water-soluble polymers are used as flocculants, for example for flocculating sewage sludge and municipal and industrial wastewaters, and as flocculants in papermaking. They can also be used as retention and drainage aids in papermaking. When introduced into water, the agglomerated water-soluble and water-swellable polymer particles disintegrate into the primary particles, which rapidly dissolve in water. The water-soluble polymers have K values of from 150 to 300 (determined according to H. Fikentscher in 0.5% strength aqueous solution at pH 7 and 25° C). In the Examples which follow, percentages are by weight. The K values of the polymers were determined according to H. Fikentscher, Cellulosechemie 13 (1932), 58–64 and 71–74, at 25° C. and at a polymer concentration of 0.5% in aqueous solution. The particle sizes of the agglomerated particles were determined by sieve analyses, while the sizes of the primary particles of the water-in-oil polymer emulsions were determined with the aid of scanning electron micrographs.

EXAMPLES

Preparation of the Water-in-oil Polymer Emulsions

General Procedure

In the process described in DE-A 36 41 700, the monomer emulsions described below are initially taken in a 2 1 polymerization vessel which is provided with an anchor stirrer, a thermometer and a nitrogen inlet and outlet. The polymerizable mixture is then emulsified for 30 minutes at room temperature under a nitrogen atmosphere at a stirring speed of 200 revolutions per minute, with the addition of 0.054 g of 2,2-azobis-(2-aminopropane) dihydrochloride. The mixture is then heated to 55°–60° C. and is polymerized in this temperature range in the course of 1.5 hours. After the addition of a further 0.054 g of 2,2-azobis-(2-aminopropane) dihydrochloride, the reaction mixture is further polymerized at 65° C. after 2 hours. The mean diameter of the primary particles of each of the water-in-oil polymer emulsions obtained is from 1 to 5 µm.

W/O Polymer 1

Composition of the monomer emulsion: 250 g of cyclohexane, 20 g of a water-in-oil emulsifier which is obtainable by (A) reacting oleyl alcohol with epichlorohydrin in a molar ratio of 1:1 to give oleyl glycidyl ether, (B) reacting the oleyl glycidyl ether with glycerol in a molar ratio of 1:1 in the presence of $BF_3$/phosphoric acid at 80° C. and removing the catalyst with the aid of a basic ion exchanger and (C) ethoxylating the reaction product from (B) with 2 mol of ethylene oxide, 3 g of a surfactant which is obtainable by reacting a $C_{13}$–$C_{15}$-oxo alcohol with 6 mol of ethylene oxide and 4 mol of propylene oxide and has a turbidity point of 32° C. in water and a viscosity of 65 mPa.s at 23° C., 175 g of acrylic acid, 15 g of acrylamide, 0.427 g of formic acid, 0.089 g of pentasodiumdiethylenetriaminepentaacetate and 0.043 g of methylenebisacrylamide.

For the preparation of the monomer emulsion, acrylic acid is first initially taken in the polymerization vessel and is neutralized to a pH of 7 by adding aqueous potassium hydroxide solution. Thereafter, the other components are added, and potassium hydroxide solution in an amount such that a pH of 8 results. Water is then added in an amount such that the total amount of the monomer emulsion is 1,000 g, and emulsification and polymerization is carried out as described above.

W/O Polymer 2

The procedure is similar to that described for the preparation of W/O polymer 1, except that, instead of acrylic acid and acrylamide, in this case 200 g of acrylic acid are used as the monomer.

W/O Polymer 3

The procedure is similar to that described for the preparation of W/O polymer 1, except that 200 g of acrylic acid are used as the monomer emulsion and the acrylic acid is neutralized with sodium hydroxide solution instead of potassium hydroxide solution.

W/O Polymer 4

25 g of N-vinylpyrrolidone are also added to the monomer emulsion described under W/O polymer 1.

W/O Polymer 5

The procedure is similar to that described for the preparation of W/O polymer 1, except that 25 g of N-vinylpyrrolidone are also added to the monomer emulsion and neutralization is carried out in this case using sodium hydroxide solution instead of KOH.

W/O Polymer 6

The procedure is similar to that described for the preparation of W/O polymer 1, except that 25 g of N-vinylpyrrolidone are also added to the monomer emulsion, the use of the surfactant is dispensed with and neutralization of the acrylic acid is carried out using sodium hydroxide solution.

W/O Polymer 7

The procedure is similar to that described for the preparation of W/O polymer 1, except that acrylamide is replaced with 25 g of N-vinylpyrrolidone.

W/O Polymer 8

The procedure is similar to that described for the preparation of W/O polymer 1, except that 25 g of N-vinylpyrrolidone are additionally added to the monomer emulsion and the use of the surfactant is dispensed with.

W/O Polymer 9

Commercial water-in-oil polymer emulsion of a water-swellable copolymer of ammonium acrylate and acrylamide, having a polymer content of 22.5% and a mean particle size of the dispersed primaryparticles of about 0.5 μm.

EXAMPLE 1

500 g of W/O polymer 1 described above are initially taken in a 2 1 glass flask which is equipped with a thermometer, an anchor stirrer and a water separator, together with 350 ml of cyclohexane and 10 g of polyethylene glycol having an average molecular weight of 300, and the mixture is stirred at a speed of 300 revolutions per minute. The content of the flask is then heated to 70°–80° C. and water is distilled off azeotropically. The azeotropic distillation is complete after about 5 hours. The polymer suspension thus obtainable rapidly settles out, and the sediment is filtered off and dried in a drying oven under reduced pressure at 50° C. A colorless, dust-free, free-flowing polymer is obtained, whose sieve analysis is shown in Table 1.

EXAMPLE 2

Example 1 is repeated, except that a polyethylene glycol having an average molecular weight of 4,000 is used as the agglomeration assistant in this case. Here too, a readily filterable, colorless, dust-free polymer powder is obtained.

EXAMPLE 3

Example 1 is repeated, except that polypropylene glycol having an average molecular weight of 600 is used as the agglomeration assistant. A colorless, dust-free agglomerated polymer is obtained, whose sieve analysis is shown in Table 1.

EXAMPLE 4

Example 1 is repeated, with the sole exception that an adduct of propylene oxide and ethylene oxide in succession with ethylenediamine is used as the agglomeration assistant. The molecular weight is about 16,000.

COMPARATIVE EXAMPLE 1

Example 1 is repeated, with the sole exception that, instead of polyethylene glycol having an average molecular weight of 300, sorbitan monooleate is used in this case. The filtration takes a relatively long time and is incomplete. The filtrate is milky white. The resulting powdery product produces a very large amount of dust.

COMPARATIVE EXAMPLE 2

Example 1 is repeated, except that, instead of the polyethylene glycol having an average molecular weight of 300, 55 g of a 17.7% strength solution of protective colloid 1 is used, this colloid being employed in inverse suspension polymerization.

The protective colloid 1 is prepared as follows: A mixture of the following components is initially taken and refluxed in a polymerization apparatus which consists of a reaction vessel which is equipped with a reflux condenser, a thermometer, a heater, a cooling apparatus, a stirrer and feed vessels and for working under an inert gas atmosphere: 1700 g of a polymer which is prepared by continuous polymerization of a monomer mixture of 83% of styrene and 17% of methacrylic acid at a temperature of 249° to 251° C. at 24 mbar and has a molecular weight of 1,870, an acid number of 104 mg KOH/g, a hydrogenation iodine number of 14 g per 100 g of polymer and a softening point of 138° C., 532 g of maleic anhydride, 1,600 g of cyclohexane, 2,470 g of tert-butyl acrylate and 65 g of tert-butyl perpivalate.

A solution of 4,730 g of tert-butyl acrylate and of 568 g of styrene in 1,766 g of cyclohexane is added in the course of 2 hours after the beginning of refluxing, and simultaneously a solution of 260 g of tert-butyl perpivalate in 833 g of cyclohexane. After complete metering of the monomers and of the polymerization initiator, the stirred reaction mixture is refluxed for a further 2 hours and then diluted with cyclohexane. A protective colloid dispersion having a polymer content of 17.7% is obtained. The graft copolymer has a K value of 32.

The polymer suspension obtained on dewatering cannot be filtered in the course of 120 minutes (paper filter, Schleicher & Schüll, medium pore size). To work up the dewatered water-in-oil polymer emulsion, the dewatered product is allowed to stand overnight and the sediment is isolated by decanting next morning and is dried. A powder which produces a very large amount of dust is obtained.

EXAMPLE 5

Example 1 is repeated, except that in this case W/O polymer 2 is used and dewatering is carried out at 200 rpm. Azeotropic drying gives a polymer suspension which settles out rapidly and can be filtered completely in the course of 1 minute. The sieve analysis of the agglomerated polymer is shown in Table 1.

EXAMPLE 6

Example 1 is repeated, except that W/O polymer 3 is used and dewatering is carried out at 200 rpm. Azeotropic dewatering gives a polymer suspension which settles out rapidly and can be filtered completely in the course of 1 minute. After drying, a colorless, dust-free polymer is obtained, whose sieve analysis is shown in Table 1.

EXAMPLE 7

Example 1 is repeated, except that W/O polymer 4 is azeotropically dewatered at 200 rpm. This procedure too gives a readily filterable polymer suspension which settles out rapidly and from which a colorless, dust-free powder is obtained. The sieve analysis is shown in Table 1. The bulk density of the product is 0.60 g/cm$^3$.

EXAMPLE 8

Example 7 is repeated, except that, instead of the agglomeration assistant used there, in this case a block copolymer of ethylene oxide/propylene oxide/ethylene oxide blocks, having an average molecular weight of 2,600 and a viscosity of 600 mPa.s (25° C.), is used. Removal of the water by azeotropic distillation gives a polymer suspension which settles out rapidly and from which a colorless, dust-free powder having the sieve analysis shown in Table 1 is obtained.

EXAMPLE 9

Example 7 is repeated, except that in this case a block copolymer of propylene oxide/ethylene oxide/propylene oxide blocks, having an average molecular weight of 2,800 and a viscosity of 675 mPa.s (25° C.), is used as the agglomeration assistant. Azeotropic drying gives a polymer suspension which settles out rapidly and from which a colorless, dust-free powder having the particle size distribution shown in Table 1 is obtained.

EXAMPLE 10

Example 1 is repeated, except that W/O polymer 5 is used and dewatering is carried out at 200 rpm. Azeotropic drying gives a polymer suspension which settles out rapidly and from which a colorless, dust-free powder having the particle size distribution shown in Table 1 is obtained.

EXAMPLE 11

Example 1 is repeated, except that in this case W/O polymer 6 is used instead of the polymer employed there and dewatering is carried out at 200 rpm. Azeotropic dewatering gives a readily filterable polymer suspension which rapidly settles out and from which a colorless, dust-free powder having the particle size distribution shown in Table 1 is obtained.

EXAMPLE 12

Example 1 is repeated, except that in this case W/O polymer 7 is used instead of the polymer stated there. Azeotropic dewatering gives a polymer suspension which settles out rapidly and is readily filterable and from which a colorless, dust-free polymer powder having the particle size distribution shown in Table 1 is obtained.

EXAMPLE 13

Example 1 is repeated, except that in this case W/O polymer 8 is used instead of the polymer employed there, 500 g of cyclohexane are additionally introduced and dewatering is carried out at a speed of 500 revolutions per minute in the course of 3 hours. A polymer suspension which settles out rapidly results, from which a colorless, dust-free polymer having the composition shown in Table 1 is obtained with the aid of filtration.

EXAMPLE 14

Example 13 is repeated, except that 20 g of a block copolymer of ethylene oxide/propylene oxide/ethylene oxide blocks, having an average molecular weight of 4,600 and a solidification point of 25° C., are used as the agglomeration assistant. A polymer suspension which settles out rapidly results, from which a colorless, dust-free polymer powder having the particle size distribution shown in Table 1 is obtained.

EXAMPLE 15

Example 1 is repeated, except that, instead of the polymer used there, in this case W/O polymer 9 is employed and is diluted with 500 g of cyclohexane, in addition 10 g of the protective colloid described in Comparative Example 2 for the inverse suspension polymerization are added and dewatering is carried out at 200 rpm. A colorless, dust-free polymer powder which has the particle size distribution shown in Table 1 is obtained.

COMPARATIVE EXAMPLE 3

500 g of cyclohexane are added to W/O polymer 9, and said polymer is subjected to azeotropic distillation without further additions. The water-in-oil polymer emulsion coagulates during this procedure. The stirrer stops.

COMPARATIVE EXAMPLE 4

500 g of cyclohexane and 20 g of the 17.7% strength solution of protective colloid 1 for the inverse suspension polymerization in cyclohexane, which solution is described in Comparative Example 2, are added to 500 g of W/O polymer 9 and dewatering is carried out azeotropically in the course of 4 hours. The polymer suspension obtained after the azeotropic dewatering is extremely difficult to filter. The attempt to effect filtration through a filter paper having a medium pore size, from Schleicher & Schüll, is terminated after 2 hours since the filter becomes blocked. On the other hand, the dispersion passed virtually completely through a 100 μm Perlon filter. The dewatered polymer suspension is therefore allowed to stand overnight and is decanted next morning, and the residue is dried under reduced pressure. This gives a powder which produces an extremely large amount of dust.

EXAMPLE 16

Example 1 is repeated, except that, instead of the polymer used there, 300 g of polymer emulsion EM 430 from Floerger are used in this case and are diluted with 450 g of cyclohexane. After 116 g of water have been obtained by azeotropic dewatering, a colorless, free-flowing and dust-free powder is obtained. The bulk density is 0.17 g/cm$^3$.

The print paste obtained is printed on a cotton fabric using a screen printing press. Thereafter, drying is carried out for 2 minutes at 110° C. and the printed article is fixed with saturated steam in the course of 10 minutes at 102° C. The article is then washed in succession with water at 20° C. and with water at 60° C. and is boiled with a wash liquor which contains 2 g/l of an adduct of 8 mol of ethylene oxide with nonylphenol. After further washing at 20° C., the article is dried. A very deep, level, well defined and soft blue print is obtained.

EXAMPLE 18

30 g of the polymer powder prepared according to Example 5 are sprinkled into 940 g of water of 15° German hardness, while stirring. The polymer can be distributed without the formation of lumps and begins to swell rapidly. Thereafter, 30 g of the blue disperse dye of the formula

TABLE 1

| | Sieve analyses of the agglomerated polymer particles | | | | | | | | | |
|---|---|---|---|---|---|---|---|---|---|---|
| | | | | | Sieve bottom (μm) | | | | | |
| | 0 | 100 | 160 | 315 | 500 | 800 | 1000 | 1400 | 2500 | 4000 | 6300 |

| Example | 0 | 100 | 160 | 315 | 500 | 800 | 1000 | 1400 | 2500 | 4000 | 6300 |
|---|---|---|---|---|---|---|---|---|---|---|---|
| 1 | 0 | 1 | 3 | 6 | 19 | 7 | 10 | 21 | 28 | 5 | 0 |
| 2 | 1 | 0 | 5 | 25 | 11 | 1 | 24 | — | 30 | 3 | 0 |
| 3 | 0 | 0 | 1 | 8 | 46 | 4 | 16 | — | 19 | 4 | 1 |
| 4 | 0 | 0 | 1 | 12 | 49 | 16 | 13 | 7 | 1 | 1 | 0 |
| 5 | 0 | 1 | 5 | 13 | 36 | — | 1 | 11 | 23 | 10 | 0 |
| 6 | 0 | 0 | 1 | 5 | 45 | — | 13 | 14 | 16 | 5 | 2 |
| 7 | 0 | 11 | 75 | 6 | 1 | 0 | 7 | — | — | — | — |
| 8 | 0 | 1 | 2 | 8 | 72 | 5 | 12 | — | — | — | — |
| 9 | 0 | 1 | 49 | 30 | 4 | 1 | 15 | — | — | — | — |
| 10 | 0 | 43 | 42 | 3 | 3 | — | 2 | 5 | 2 | 0 | 0 |
| 11 | 1 | 18 | 70 | 2 | 2 | 0 | 1 | 6 | — | — | — |
| 12 | 0 | 8 | 77 | 2 | 3 | — | 2 | 4 | 3 | 1 | 0 |
| 13 | 4 | 52 | 38 | 1 | 2 | 1 | 1 | 1 | — | — | — |
| 14 | 1 | 1 | 7 | 52 | 35 | 0 | 1 | 3 | — | — | — |
| 15 | 0 | 1 | 14 | 18 | 37 | 3 | 4 | 11 | 11 | 1 | 0 |
| 16 | 3 | 18 | 52 | 10 | 6 | 1 | 1 | 3 | 3 | 2 | 1 |
| Comp. Ex. | | | | | | | | | | | |
| 1 | 82 | 11 | 2 | 1 | 1 | 1 | 1 | 1 | — | — | — |
| 2 | 85 | 3 | 4 | 2 | 2 | 2 | 1 | 1 | 0 | 0 | 0 |

When introduced into water, the polymer particles obtained according to Examples 1 to 16 disintegrate into the primary particles, which swell to such an extent that structureless gels are obtained.

EXAMPLE 17

40 g of the polymer powder prepared according to Example 1 are sprinkled into 795 g of distilled water, while stirring. The polymer can be readily distributed and does not agglomerate. Stirring is then carried out for three minutes at 12,000 revolutions per minute, using a high speed stirrer. A smooth paste is obtained. 120 g of urea, 25 g of sodium carbonate, 10 g of sodium m-nitrobenzenesulfonate and 10 g of the pulverulent blue reactive dye having Colour Index No. 61,205 are then added in succession while stirring, and the mixture is homogenized for 3 minutes at 10,000 revolutions per minute.

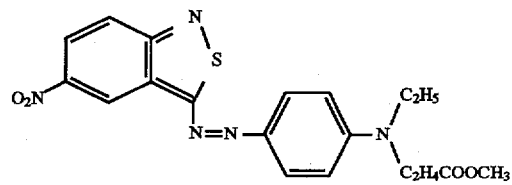

in the liquid, nonionic finished commercial form are added and the mixture is stirred for three minutes at 10,000 revolutions per minute, using a high speed stirrer.

The print paste thus obtained is printed on polyester knitwear with the aid of a screen. The print is dried for 3 minutes at 100° C. and fixed with superheated steam for 10 minutes at 170° C. A deep blue print having good levelness, well defined contours and a soft handle is obtained.

EXAMPLE 19

25 g of the polymer prepared according to Example 6 are sprinkled, while stirring, into a mixture of 831 g of tap water, 4 g of a 25% strength ammonia solution, 10 g of a commercial fixer based on hexamethoxymethylmelamine and 120 g of a commercial binder based on a 45% strength dispersion of a copolymer of butyl acrylate, styrene and N-methylolmethacrylamide. The polymer disperses without agglomerating in the aqueous formulation and begins to swell rapidly. The mixture is stirred for four minutes at 10,000 revolutions per minute, using a high speed stirrer. Thereafter, 10 g of the red pigment having Colour Index No. 12,485 are added and stirring is continued for one minute at 5,000 revolutions per minute.

The print paste obtained is then printed on a blend of 65% of polyester and 35% of cotton using a screen. Thereafter, drying is carried out for 2 minutes at 100° C. and fixing is effected in the course of 5 minutes at 150° C. using hot air. A blue, deep, brilliant red print having good levelness, sharp contours, a soft handle and good fastness to rubbing and to dry cleaning is obtained.

EXAMPLE 20

4.5 g of the polymer powder prepared according to Example 7 are sprinkled into 5 g of a commercial emulsifier based on an alkylpolyglycol ether in 530.5 g of tap water, while stirring. The mixture begins to thicken after only a few seconds. Stirring is then carried out for two minutes at 8,000 revolutions per minute using a high speed stirrer. 300 g of gasoline are emulsified in the homogeneous, viscous mixture while stirring at 8,000 revolutions per minute in the course of one minute. Thereafter, stirring is continued for one minute at 10,000 revolutions per minute and 120 g of a commercial binder based on a 45% strength aqueous dispersion of a copolymer of butadiene, styrene, acrylonitrile and N-methylolmethacrylamide and 30 parts of the red pigment having Colour Index No. 12,475 are added. The mixture is stirred for a further two minutes at 10,000 revolutions per minute.

The print paste obtained is then printed on a cotton fabric with the aid of a roller printing machine. The print is dried for 3 minutes at 100° C. and fixed with hot air for 5 minutes at 150° C. A brilliant, deep, level, well defined red print having a soft handle, good fastness to rubbing and good wet fastness is obtained.

EXAMPLE 21

40 g of the polymer powder prepared according to Example 10 are sprinkled into a mixture of 560 g of tap water, 150 g of potassium carbonate, 25 g of thiodiglycol, 25 g of glycerol, 150 g of sodium hydroxymethanesulfinate (in the form of the dihydrate) and 50 g of the liquid commercial form of the red vat dye having C.I. No. 67,000.

The polymer powder disperses without forming lumps and begins to thicken after only a few seconds. Thereafter, stirring is carried out for 4 minutes at 10,000 revolutions per minute using a high speed stirrer. The print paste obtained is printed on a cotton fabric using a screen printing press. Thereafter, drying is carried out for 2 minutes at 100° C. and the printed article is fixed with saturated steam in the course of 15 minutes at 102° C.

Washing is then carried out with water at 20° C., after which the textile article is introduced into a wash liquor which is at 60° C. and contains 2 g/l of 30% strength hydrogen peroxide. After a residence time of 2 minutes, the article is washed again with water at 20° C. and then boiled with a wash liquor which contains 1 g/l of an adduct of 8 mol of ethylene oxide with nonylphenol. After further washing at 20° C., the article is dried. A level, well defined and soft red print is obtained.

EXAMPLE 22

40 g of the polymer powder prepared according to Example 11 are sprinkled into 930 g of water of 15° German hardness, while stirring. 30 g of the blue disperse dye of the formula

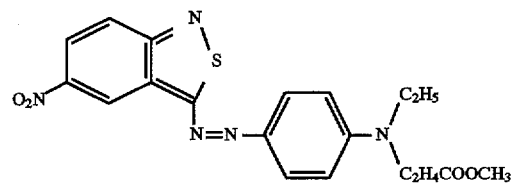

in the liquid, nonionic finished commercial form are then added, and the mixture is stirred for three minutes at 10,000 revolutions per minute using a high speed stirrer.

The print paste thus obtained is printed on polyester knitwear with the aid of a screen. The print is dried for 3 minutes at 100° C. and fixed with superheated steam for 10 minutes at 170° C.

Thereafter, the fabric is washed at 20° C. and then washed with a solution which is at 60° C. and contains 1 /l of an adduct of 8 mol of ethylene oxide with nonylphenol, 1 g/l of 50% strength sodium hydroxide solution and 2 g/l of sodium dithionite. Washing is then carried out again at 20° C. and drying is effected. A deep blue print having good levelness, well defined contours, a very soft handle and good fastness to rubbing and to washing is obtained.

EXAMPLE 23

Example 17 is repeated, except that, instead of the thickener stated there, 36 g of the polymer prepared according to Example 12 are used. A deep, level and well defined blue print is obtained.

EXAMPLE 24

Example 18 is repeated, except that, instead of the thickener used there, 38 g of the polymer prepared according to Example 13 are used. A deep blue print having good levelness and well defined contours results.

We claim:

1. A dust-free powder formed by isolating polymer particles from a water-in-oil emulsion of a water-soluble or water-swellable polymer, wherein the water-in-oil polymer emulsion is azeotropically dewatered in the presence of from 1 to 40% by weight, based on the polymer, of a polyalkylene glycol which, (a) is synthesized by an addition reaction of a $C_2$–$C_4$-alkylene oxide with an alcohol, phenol, amine or carboxylic acid; and (b) contains not less than 2 polymerizable alkylene oxide units;

wherein said polyalkylene glycol is selected from the group consisting of polyethylene glycols, polypropylene glycols, block copolymers of ethylene oxide and propylene oxide, polyethylene glycols esterified at one or both ends with $C_1$–$C_4$-alcohols, and addition products of ethylene oxide and propylene oxide with ethylene diamine, wherein the particles of said polymer have a mean diameter of from 20 to 5,000 μm, and the particles of said powder comprise primary particles having a mean diameter of from 0.1 to 15 μm.

2. The dust-free powder of claim 1, wherein the water-soluble polymer is synthesized by polymerizing water-soluble monomers from the group consisting of monoethylenically unsaturated $C_3$–$C_6$-carboxylic acids, acrylamide, methacrylamide, N-vinylpyrrolidone, 2-acryl-amido-2-methylpropanesulfonic acid, vinylsulfonic acid, dimethylaminoethyl acrylate and diethylaminoethyl acrylate in the aqueous phase of a water-in-oil emulsion in the presence of a water-in-oil emulsifier and a polymerization initiator.

3. The dust-free powder of claim 1, wherein the water-swellable polymer is synthesized by polymerizing water-soluble monoethylenically unsaturated monomers in the presence of from 50 to 5,000 ppm of a monomer containing two or more ethylenically unsaturated, non-conjugated double bonds, as a crosslinking agent, in the aqueous phase of a water-in-oil emulsion in the presence of a water-in-oil emulsifier and a polymerization initiator.

4. The dust-free powder of claim 1, wherein the water-swellable polymer contains acrylic acid, acrylamide and N-vinylpyrrolidone as essential polymerized water-soluble monoethylenically unsaturated monomers.

5. The dust-free powder of claim 1, wherein said polyalkylene glycol is selected from the group consisting of diethylene glycol, triethylene glycol, tetraethylene glycol, pentamethylene glycol, hexaethylene glycol, heptaethylene glycol, octaethylene glycol, diethylene glycol dimethyl ether, diethylene glycol monomethyl ether, diethylene glycol diethyl ether, diethylene glycol monoethyl ether, triethylene glycol monomethyl ether, triethylene glycol dimethyl ether, triethylene glycol monoethyl ether, triethylene glycol diethyl ether, dialkylene glycol dibutyl ether, diethylene glycol monobutyl ether, diethylene glycol monopropyl ether, diethylene glycol dipropyl ether, EO-PO block copolymers having an average molecular weight of from 120 to 2 million, PO-EO-PO block copolymers having an average molecular weight of from 178 to 2 million, EO-PO-EO block copolymers having an average molecular weight of from 164 to 2 million, polypropylene glycols having a molecular weight of from 134 to 2 million, dipropylene glycol diacetate, diethylene glycol diacetate, dipropylene glycol monoacetate, diethylene glycol monoacetate, dipropylene glycol dimethyl ether and dipropylen glycol monomethyl ether.

6. The dust-free powder of claim 1, wherein said polyalkyleneglycol is selected from the group consisting of polyethylene glycol, polypropylene glycol, an adduct of propylene oxide and ethylene oxide with ethylene diamine, a block copolymer of ethylene oxide/propylene oxide/ethylene oxide and a block copolymer of propylene oxide/ethylene oxide/propylene oxide.

7. The dust-free powder of claim 1, wherein said polyalkylene glycol is selected from the group consisting of polyethylene glycols and polypropylene glycols, and wherein said polyalkylene glycol has an average molecular weight of 300–4,000.

8. The dust-free powder of claim 6, wherein said polyalkylene glycol is a block copolymer with an average molecular weight of 2,600–4,600.

9. The dust-free powder of claim 1, wherein said water-in-oil emulsion comprises an inert hydrophobic liquid.

10. The dust-free powder of claim 1, wherein said water-in-oil emulsion comprises a solvent selected from the group consisting of aliphatic hydrocarbons, aromatic hydrocarbons, halogenated hydrocarbons and mixtures thereof.

11. The dust-free powder of claim 1, wherein said water-in-oil emulsion comprises an aliphatic hydrocarbon selected from the group consisting of pentane, hexane, heptane, octane, nonane, decane, cyclohexane, methylcyclohexane, decalin, isooctane and ethylcyclohexane.

12. The dust-free powder of claim 1, wherein said water-in-oil emulsion comprises an aromatic hydrocarbon selected from the group consisting of benzene, toluene, xylene and isopropylbenzene.

13. The dust-free powder of claim 1, wherein said water-in-oil emulsion comprises a halogenated hydrocarbon selected from the group consisting of tetrachloroethane, hexachloroethane, trichloroethane and chlorobenzene.

14. The dust-free powder of claim 1, wherein said water-in-oil emulsion comprises a solvent selected from the group consisting of cyclohexane, methylcyclohexane and a hydrocarbon boiling at a temperature of from 60°–170° C.

15. The dust-free powder of claim 1, wherein said polyalkylene glycol is not removed.

* * * * *